United States Patent [19]

Suda et al.

[11] Patent Number: 4,820,028

[45] Date of Patent: Apr. 11, 1989

[54] ZOOM LENS WITH A VARIABLE REFRACTIVE INDEX ELEMENT

[75] Inventors: Shigeyuki Suda, Tokyo; Takeshi Baba, Yokohama, both of Japan

[73] Assignee: Canon Kabushiki Kaisha, Tokyo, Japan

[21] Appl. No.: 813,227

[22] Filed: Dec. 24, 1985

[30] Foreign Application Priority Data

Dec. 28, 1984 [JP] Japan ................................ 59-276492

[51] Int. Cl.$^4$ ........................ G02B 7/11; G02B 15/14; G02B 9/64
[52] U.S. Cl. .................................... 350/423; 350/429
[58] Field of Search ............... 350/423, 413, 487, 429, 350/430

[56] References Cited

U.S. PATENT DOCUMENTS

| | | | |
|---|---|---|---|
| 4,407,567 | 10/1983 | Michelet et al. | 350/423 |
| 4,444,471 | 4/1984 | Ford, Jr. et al. | 350/423 |
| 4,571,032 | 2/1986 | Someya et al. | 350/423 |
| 4,697,891 | 10/1987 | Kawai | 350/429 |

FOREIGN PATENT DOCUMENTS

| | | |
|---|---|---|
| 2006970 | 12/1970 | Fed. Rep. of Germany . |
| 2222536 | 11/1972 | Fed. Rep. of Germany . |
| 2802754 | 9/1979 | Fed. Rep. of Germany . |
| 0101618 | 6/1984 | Japan . |
| 0116711 | 7/1984 | Japan . |
| 0116712 | 7/1984 | Japan . |
| 0116710 | 7/1987 | Japan . |

OTHER PUBLICATIONS

McMahon; "Liquid Optics . . . A New Horizon"; The Surveyor; vol. 3, No. 4, 11/1967, pp. 26–28.

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

A zoom lens having a plurality of lens units at least one of which includes a variable refractive index element for zooming and focusing purpose. The refractive index of the variable refractive index element of the zoom lens is varied by an output from an auto-focus detection device.

3 Claims, 10 Drawing Sheets

FIG. IA
PRIOR ART
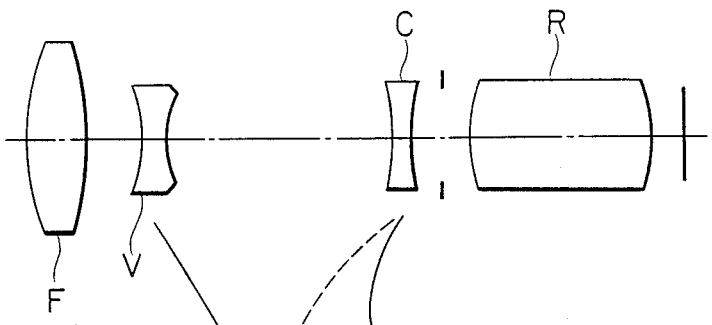
FIG. IB
PRIOR ART
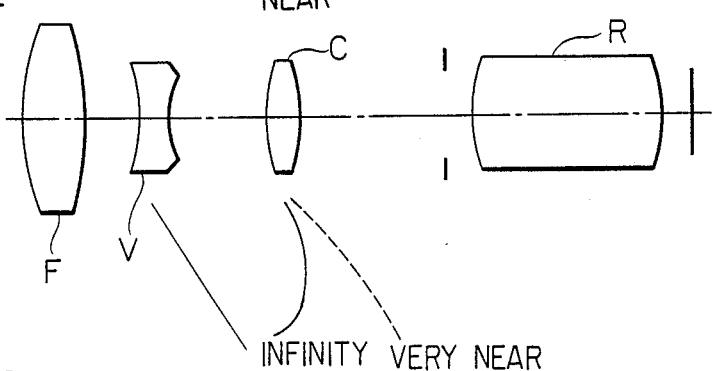
FIG. IC
PRIOR ART
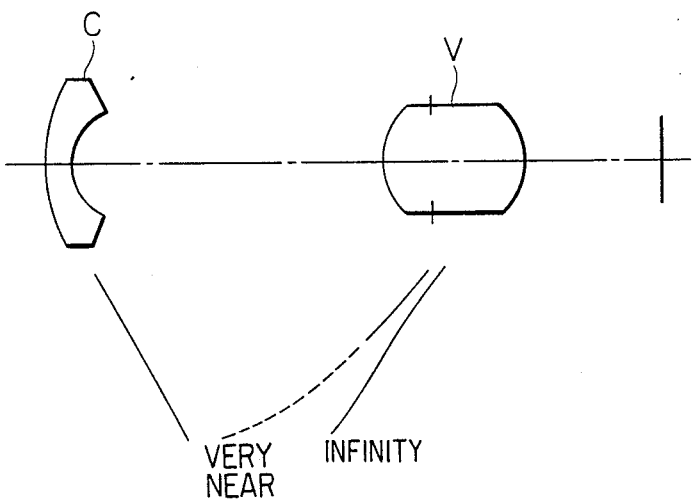

ZOOM LENS WITH A VARIABLE REFRACTIVE INDEX ELEMENT

BACKGROUND OF THE INVENTION

1. Field of the Invention

The present invention relates to a zoom lens which uses a variable refractive power element capable of controlling a refractive power of a lens.

2. Description of the Prior Art

In a prior art imaging optical system which is focused by electronic control such as a zoom lens used in a still camera or a video camera, a focus lens comprising light weight lenses is desirable because of a reguirement of power saving and compactness of a drive motor. In a normal zoom lens, focusing is effected by a front element of the lens unit which is the heaviest one. Japanese Unexamined Patent Publication No. 107347/1978 and 127321/1979 show a method in which the focusing is effected by a small size lens group called a compensator, as shown in FIG. 1A.

In FIG. 1A, F denotes a front lens, V denotes a variator which varies a magnification of an overall system by shifting along an optical axis, C denotes a compensator which is moved along the optical axis to keep the image of the overall system at a constant position, and R denotes a relay lens group. Solid lines shown below V and C show locus of movement of V and C when the lens is zoomed from a wide angle end to a telescope end when an object is at an infinite point, and a broken line shows a similar locus when the object is at a very near point. FIGS. 1B and 1C show similar loci.

As seen from FIGS. 1A to 1C, in such a system, the drive amount for focusing at the telescope end is large. In order to secure a space for the drive amount, it is necessary to increase a spacing between the variator V and the compensator C in FIGS. 1A and 1C, and a spacing between the compensator C and the relay lens R in FIG. 1B. Thus, it is difficult to reduce the overall length of the zoom lens. Further, since an iris is spaced from the front element of the zoom lens, it is difficult to reduce the diameter of the front element. In FIG. 1C, it is principally impossible to focus the lens to a very near object where an image distance to the variator V is less than four times of a focal distance of the variator V.

Since the movement of the compensator is not determined only by the magnification of the front element focusing zoom lens but is determined based on both the distance to the object and the magnification, mechanical control by a cam is not allowed. Accordingly, a relationship among the position of the compensator C, the position of the variator V and the distance to the object is stored, and the position of the variator V and the distance to the object are detected so that the position of the compensator C is determined by the motor control. This system, however, requires a position detector for the variator, and it is difficult attain a high precision of positioning of the compensator because of a capacity of a memory. The most effective positioning system for the compensator of the zoom lens is a so-called TTL or semi-TTL auto-focusing system. In an active system in which a light flux is projected and a return light is detected, it is necessary to provide both a projection light source and a photo-sensing element. As a result, a structure is complex and additional parts are required. In a system in which defocus state of an image is detected based on an image signal from an imaging device arranged on a predetermined image plane of the zoom lens, a focusing time is relatively long.

SUMMARY OF THE INVENTION

It is an object of the present invention to provide a zoom lens which is compact and suitable to electronic control.

It is another object of the present invention to provide an optimum control signal for a variable refractive index element.

BRIEF DESCRIPTION OF THE DRAWINGS

FIG. 1A shows a construction of a prior art zoom lens,

FIGS. 1B and 1C show other prior art zoom lenses,

DESCRIPTION OF THE PREFERRED EMBODIMENTS

Figure 2A:
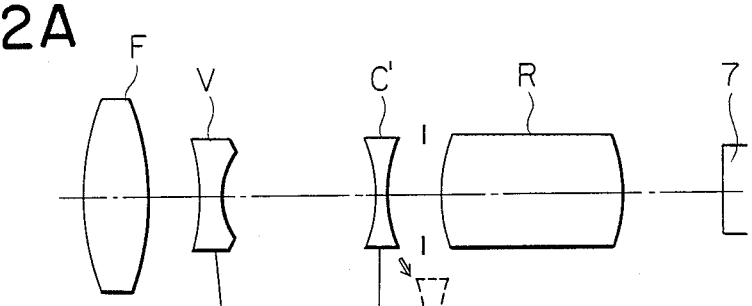
FIGS. 2A–2C, 3 and 4 show constructions of zoom lenses of the present invention.
Figure 2B:
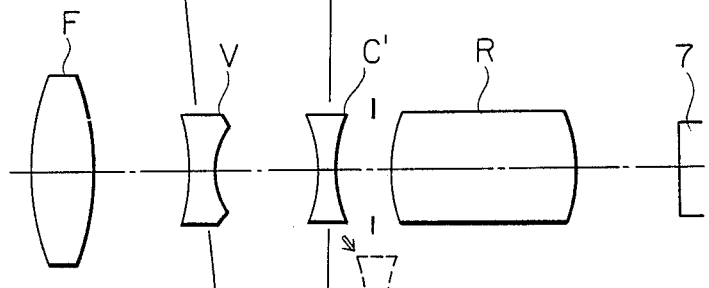
Figure 2C:
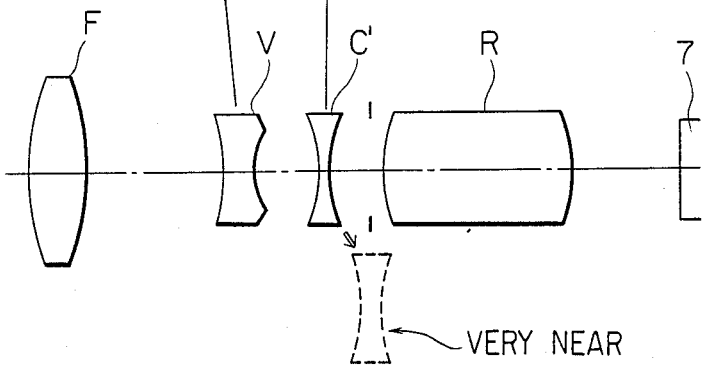

FIG. 2 shows a construction of the zoom lens of the present invention. In FIG. 2, F denotes a stationary front element, V denotes a variator which is movable along an optical axis to vary a magnification, R denotes a stationary relay lens and C' denotes a stationary compensator having at least one variable refractive power element capable of varying a refractive index of the lens by varying a refractive index of a lens medium or a plane shape of the lens. By varying the refractive power of the variable refractive index element, the image plane of the overall system can always be kept at a constant position in spite of the change of magnification due to the movement of the variator V and the change of the distance to the object. FIG. 2A shows the zoom status at a wide angle end, FIG. 2C shows the zoom status at a telescope end, and FIG. 2B shows the zoom status at a middle point. For the object at an infinite point, the refractive indices of the compensator C' in FIGS. 2A and 2C are approximately equal negative values and in FIG. 2B, the negative refractive power is smaller than those in FIGS. 2A and 2C. For the object at a very near point, the refractive power of C' is smaller than that for the infinite object in FIGS. 2A, 2B and 2C so that the image plane is kept at the same position.

As seen from the above explanation, the present zoom lens does not need extra space for driving the lens in focusing it as opposed to the prior art lens shown in FIG. 1. In addition, compact optical system suitable for the electronic control is provided.

Figure 3:
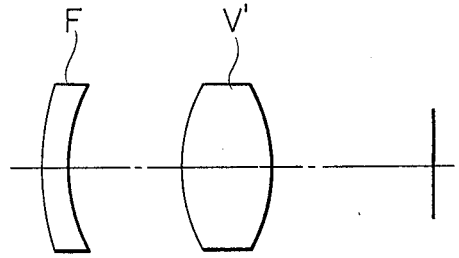

FIG. 3 shows another embodiment of the present invention. F denotes a stationary front element, and V' denotes a lens unit having at least one variable refractive index element and movable along an optical axis. The magnification is varied by the movement of the lens unit V' along the optical axis, and the refractive index of the variable refractive element is varied to keep the image plane of the overall system at a predetermined position when the magnification is varied and the distance to the object changes. Unlike the previous embodiment, the refractive power of the variator V' of the zoom lens of the present embodiment varies. Accordingly, the lens can be focused to the object at any distance.

Figure 4:
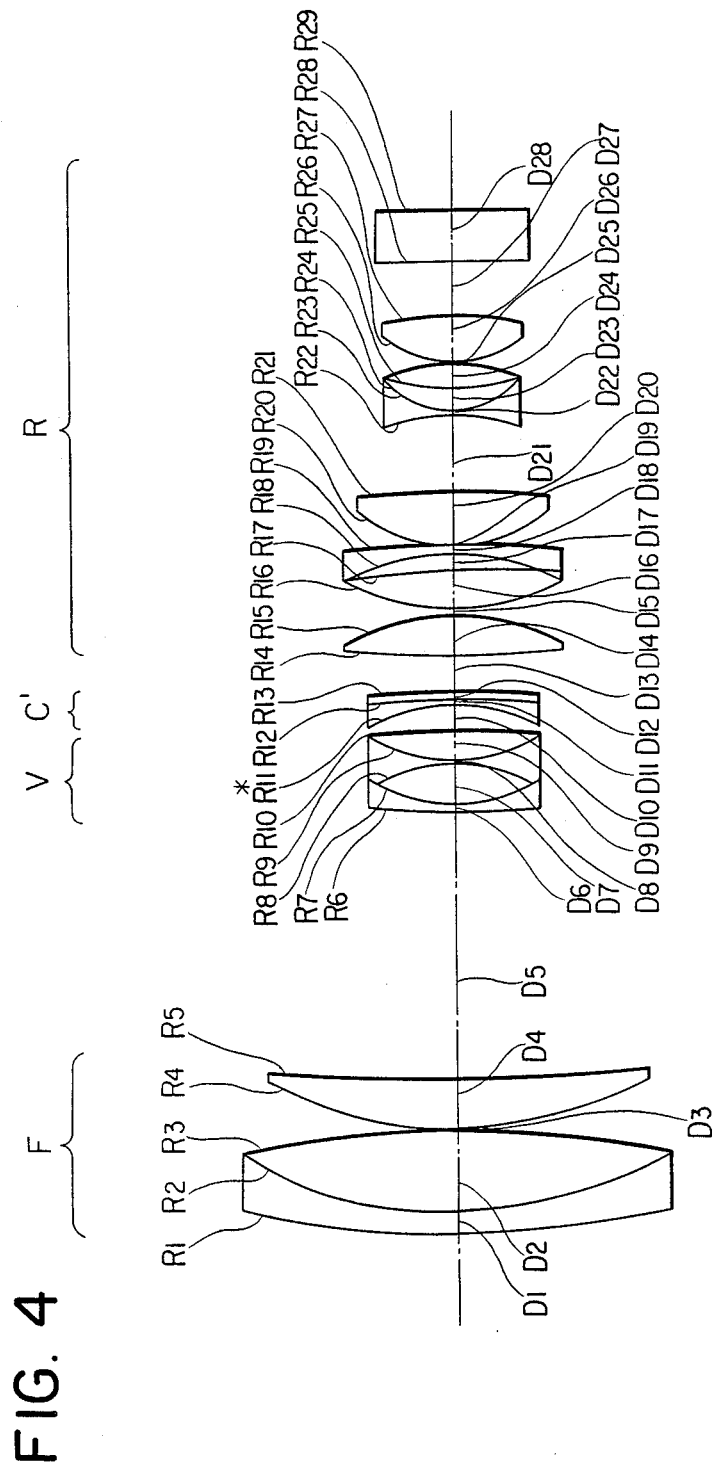

FIG. 4 shows a practical embodiment of the zoom lens of the present invention. It comprises, looking from the object, a two-group three-lens focus unit F, a two-group three lens variator V and a one-group two-lens compensator C' having a variable refractive power element which has planes having radii of curvature R11 and R12 and which has a variable plane shape. Rn(n=1, 2, 3, ...) represents a radius of curvature of an n-th plane counted from the object side, and Dn represents an air gap or thickness along the axis between the n-th plane and the (n+1)th plane. Table 1 shows lens data of the present embodiment, Table 2 shows values of D5 and D10 at different positions a, b and c of the variator V, a radius of curvature R11 of the variable refractive power element which causes the lens back for the infinite object to zero for any position of the variator V and the focal distance f of the overall system, and Table 3 shows the radius of curvature R11 of the variable refractive power element which causes the lens back to zero for the object which is 90 mm in front of the second plane r1 for the positions a, b and c of Table 2.

TABLE 1

| No | R | D | N |
|---|---|---|---|
| 1 | 9.041 | 0.235 | 1.805 |
| 2 | 4.214 | 0.883 | 1.516 |
| 3 | −14.610 | 0.013 | 1 |
| 4 | 4.000 | 0.541 | 1.603 |
| 5 | 25.089 | Variable | 1 |
| 6 | 18.520 | 0.106 | 1.773 |
| 7 | 1.623 | 0.387 | 1 |
| 8 | −2.015 | 0.097 | 1.697 |
| 9 | 2.015 | 0.284 | 1.847 |
| 10 | −37.466 | Variable | 1 |
| 11 | Variable | 0.047 | 1.410 |
| 12 | ∞ | 0.040 | 1.697 |
| 13 | −19.477 | 0.384 | 1 |
| 14 | 12.026 | 0.417 | 1.697 |
| 15 | −2.363 | 0.097 | 1 |
| 16 | 2.452 | 0.417 | 1.564 |
| 17 | −7.619 | 0.146 | 1 |
| 18 | −2.626 | 0.113 | 1.847 |
| 19 | −19.095 | 0.013 | 1 |
| 20 | 1.511 | 0.532 | 1.603 |
| 21 | −36.047 | 0.829 | 1 |
| 22 | −2.711 | 0.071 | 1.834 |
| 23 | 0.949 | 0.245 | 1 |
| 24 | 3.310 | 0.248 | 1.516 |
| 25 | −2.109 | 0.013 | 1 |
| 26 | 1.221 | 0.470 | 1.516 |
| 27 | −4.062 | 0.532 | 1 |
| 28 | ∞ | 0.532 | 1.516 |
| 29 | ∞ | | |

TABLE 2

| | a | b | c |
|---|---|---|---|
| D5 | 0.094 | 2.047 | 2.882 |
| D10 | 3.048 | 1.095 | 0.260 |
| R11 | −1.992 | −2.376 | −1.948 |
| f | 1.01 | 3.07 | 5.95 |

TABLE 3

| | a | b | c |
|---|---|---|---|
| R11 | −2.006 | −2.548 | −2.425 |

The variable refractive power element may be an element of which refractive power is varied by changing a refractive index by utilizing liquid crystal as shown in Japanese Patent Application Laid-open No. 151854/1979, or an element which utilizes an electro-optical crystal as shown in Japanese Patent Application Laid-open No. 1126/1983.

A variable plane shape element shown in Japanese Patent Application Nos. 219113/1983 and 228692/1983 of which is commonly assigned with the present Application, is explained below.

Figure 5B:
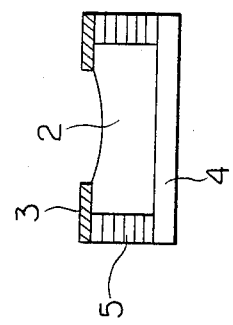
FIGS. 5A and 5B show variable refractive index elements.
Figure 5A:
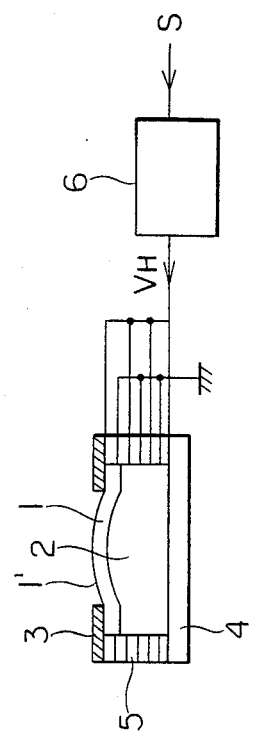

FIG. 5A shows an embodiment of a variable plane shape element. Numerals 1 and 2 denote transparent elastic members, numeral 3 denotes an aperture plate having a circular aperture, numeral 4 denotes a glass plate, numeral 5 denotes a lamination of ring-shaped piezo-electric elements, and numeral 6 denotes a high voltage generation circuit. A high voltage $V_H$ generated by the high voltage generation circuit 6 is applied to the ring-shaped piezo-electric element 5 so that the ring-shaped piezo-electric elements 5 are shrunk in the longitudinal direction of the drawing to bring the glass plate 4 bonded to the ring-shaped piezo-electric elements closer to the aperture plate 3. As a result, the elastic members 1 and 2 are compressed and project out of the aperture of the aperture plate 3 so that the shape of the surface 1' of the elastic member 1 is changed. As a result, the refractive power of the elastic member 1 is changed. The change of the refractive index can be controlled by the high voltage $V_H$ applied to the ring-shaped piezo-electric elements 5 by the high voltage generation circuit 6 by a control signal S.

The elastic members 1 and 2 have different elastic modules. By properly selecting the elastic modules and thickness, the surface 1' of the elastic member 1 can be kept in a desired shape, for example spherical even when the refractive index is changed. The materials of the elastic members 1 and 2 may be silicone rubber from standpoints of transparency and uniformity. For example, the elastic member 1 may be Shinetsu Silicone KE106 and the elastic member 2 may be Shinetsu Silicone KE104 Gel. In this case, since the refractive indices of the elastic members 1 and 2 are close to each other, an affect by the change of shape in the interface can be neglected in many applications.

In FIG. 5B, a negative refractive power material is used. The like elements to those shown in FIG. 5A are designated by the like numerals. In the present embodiment, the upper edge of the transparent elastic member is bonded to the aperture plate, and the lower surface thereof is bonded to the glass plate.

A control method for the variable refractive power element suitable for the zoom lens is now described. In the present embodiment, the focusing for the change of magnification and the change of the distance to the object is adjusted by changing the refractive power of the variable refractive power element. Accordingly, the focus adjustment is attained faster than the prior art system in which the lens unit is moved. On the other hand, because of a variation of the refractive power of the variable refractive power element by a temperature, it is difficult to open loop control the refractive power. In the present embodiment, the sharpness of the image projected on the imaging element is detected by the image signal derived from the imaging element arranged on a predetermined image plane of the zoom lens, and the refractive power of the variable refractive power element is controlled such that the highest sharpness is always attained. The refractive index of the variable refractive power element is varied by a small amount at a high speed by utilizing a high response time of the change of the refractive power of the variable refractive power element so that a direction in which the sharpness increases is detected. The present invention is particularly effective in a TV camera or a video camera. A typical period of the high speed, small change of the refractive power of the variable refractive power element is one frame (30 Hz).

In the following description, the variable refractive power element shown in FIGS. 5A and 5B is used.

Figure 6:
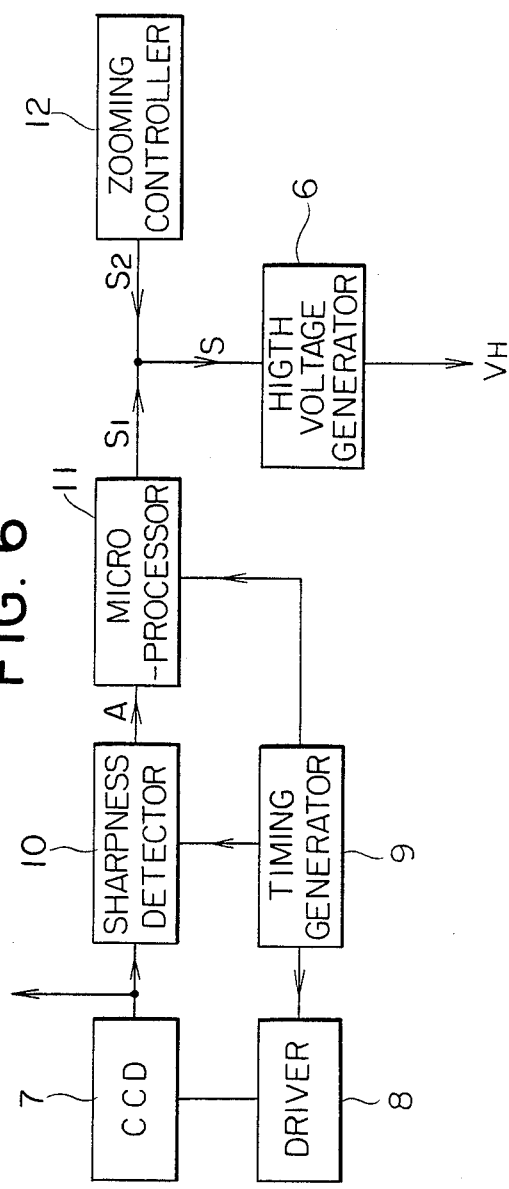
FIG. 6 shows a control circuit for the variable refractive index element.

FIG. 6 shows a basic configuration of a control circuit for the variable refractive power element. Numeral 7 denotes a CCD arranged on a predetermined focal plane of the overall system, numeral 8 denotes a driver for driving the CCD 7, and numeral 9 denotes a timing signal generator for generating a timing signal for the overall system. The image signal produced by the CCD 7 is combined with a synchronization signal to form a video signal, which is supplied to a sharpness detector 10. The sharpness detector 10 detects the sharpness of the image projected to a predetermined area on the CCD 7 for each frame in accordance with the timing signal generated by the timing generator 9, and supplies a detection signal to a microprocessor 11. The microprocessor 11 reads in the detected sharpness signal at the end of the detection by the sharpness detector 10 in accordance with the output of the timing generator 9. Numeral 6 denotes the high voltage generation circuit shown in FIG. 5. It varies the voltage $V_H$ to be applied to the ring-shaped piezo-electric element 5 shown in FIG. 5 in accordance with the control signal S1 generated by the microprocessor 11. Numeral 12 denotes a zooming controller. When an operator selects a desired magnification, the zooming controller 12 generates a corresponding signal S2 which is combined with the control signal S1 and applied to the high voltage generation circuit 6.

Figure 7:
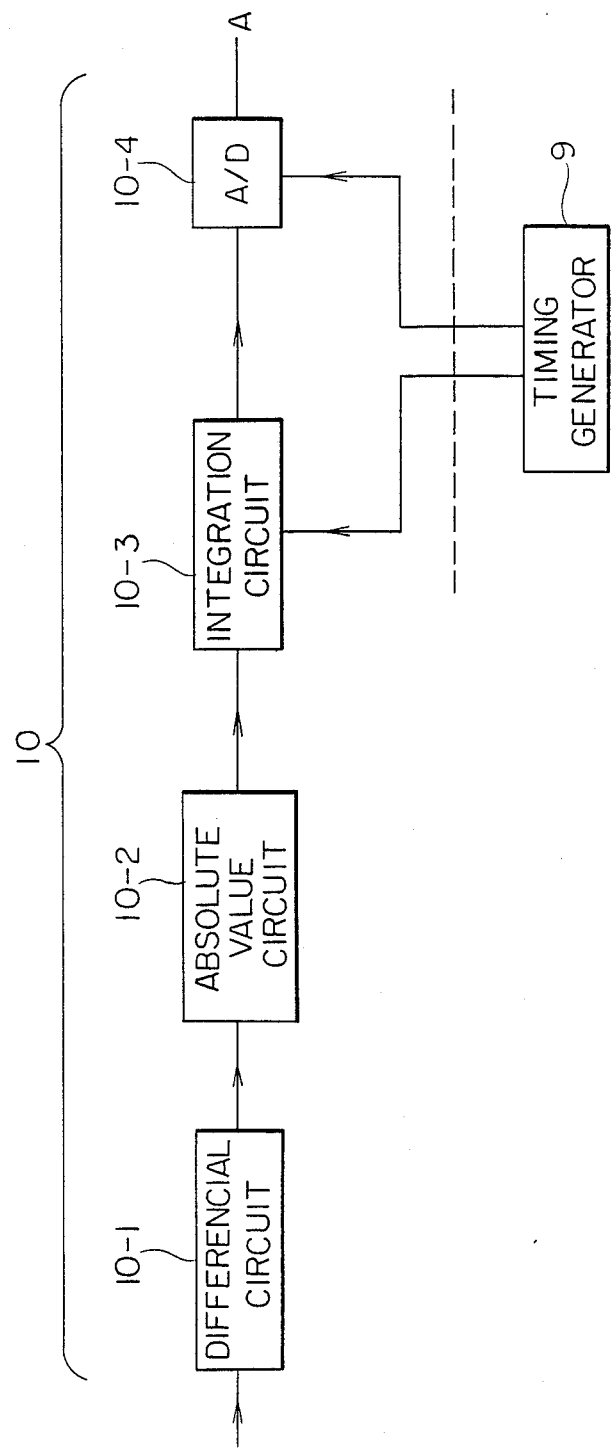
FIG. 7 shows a sharpness detector shown in FIG. 6.

FIG. 7 shows an embodiment of the sharpness detector 10. Numeral 10-1 denotes a differentiation or differential circuit for differentiating the image signal supplied from the CCD 7, numeral 10-2 denotes an absolute value circuit, numeral 10-3 denotes an integration circuit and numeral 10-4 denotes an A/D converter. The integration circuit 10-3 integrates the input signal for a predetermined time period in accordance with the timing signal generated by the timing signal generator 9. The integrated signal is A/D converted and the digital signal is supplied to the microprocessor. By this arrangement, the contrast of the image projected to the CCD is determined and used as an evaluation for the sharpness of the image.

Figure 8:
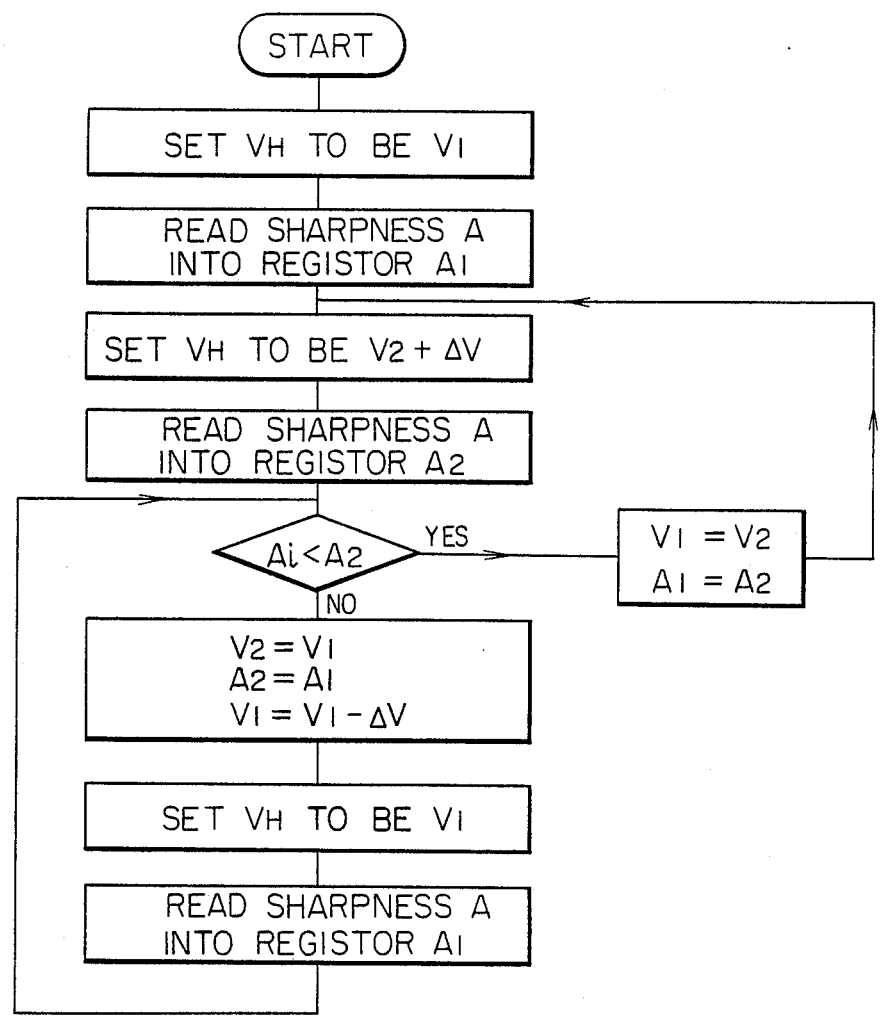
FIG. 8 is a flow chart showing an algorithm to control the variable refractive index element.

An algorithm for controlling the refractive index of the variable refractive power element will now be explained. FIG. 8 shows a basic flow chart. The sharpnesses of two images detected in two different conditions in which the refractive indices of the variable refractive power elements are slightly different and hence the image plane positions of the overall system are slightly different, are compared and the refractive power of the variable refractive power element is varied in the direction to increase the sharpness.

In FIG. 8, the control signal S is applied to the high voltage generation circuit 6 such that the voltage $V_H$ applied to the ring-shaped piezo-electric element is equal to a content of a register V1. Then, the sharpness A is read into a register A1. A content of a register V2 is set to $V1+\Delta V(\Delta V>0)$, and $V_H$ is controlled to be equal to V2. Then, the sharpness A is read into a register A2, and A1 and A2 are compared. If A1<A2, the sharpness will increase if $V_H$ is raised. Thus, V1 is changed to V2 and A1 is changed to A2, and $V2=V1+\Delta V1$ is applied as $V_H$. The comparison of A1 and A2 is again made. If A1>A2, $V_H$ must be lowered. thus, V2 is changed to V1, A2 is changed to A1 and $V1=V1-\Delta V$ is applied as $V_H$. Then, the sharpnesses are compared.

In this manner, the refractive power of the variable refractive power element is always changed in the direction to increase the sharpness so that a high quality image is produced.

FIGS. 9A–9E show an improved algorithm for controlling the refractive power of the variable refractive power element. In FIGS. 9A–9E Vi→$V_H$(i=1–6) indicates that the control signal S is applied to the high voltage generation circuit 6 such that the voltage applied to the ring-shaped piezo-electric element 5 reaches the content of the register Vi of the microprocessor, and Ai←A(i=1–6) indicates that the sharpness of the image when the applied voltage $V_H$ is equal to Vi is read into the register Ai.

Figure 9A:
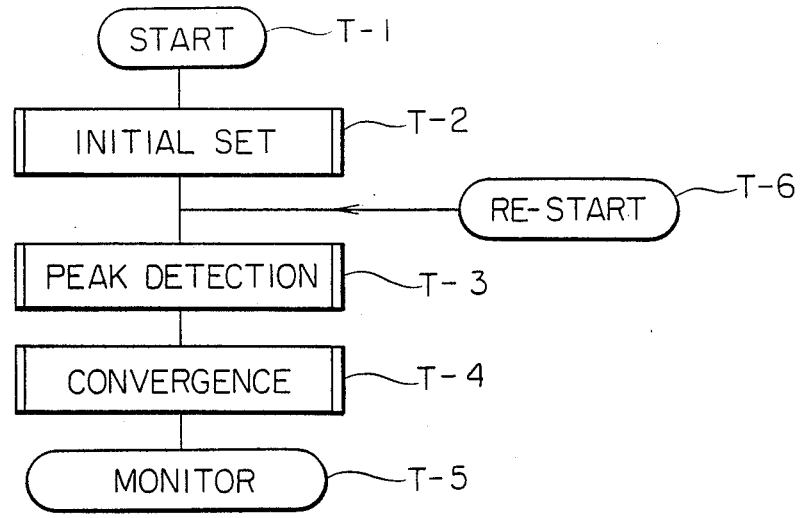
FIGS. 9A–9E represent a flow chart showing another algorithm to control the variable refractive index element.

As shown in FIG. 9A, after initialization T-2, a peak detection T-3 is carried out. In the peak detection T-3, the applied voltage $V_H$ to the ring-shaped piezo-electric element is varied, and V1, V2 and V3 (V1<V2<V3) which cause the sharpnesses A1, A2, A3 at three conditions V1, V2 and V3 to be A1<A2 and A2>A3, are searched. When such V1, V2 and V3 are detected, the sharpness of the image is highest when $V_H$ is between V1 and V3. In the next convergence T-4, $V_H$ is changed between V1 and V3 and the V2 which causes the sharpness to be highest is determined, and it is applied to the ring-shaped piezo-electric element as $V_H$. At this moment, the refractive power of the variable refractive power element has been controlled such that the optimum focal plane for the current magnification of the zoom lens and the current distance of the object coincides to the image plane of the CCD which is the predetermined image plane.

In monitor T-5, the sharpness detection is repeated with the constant $V_H$ to monitor any change in the sharpness. If there is no change, the monitor is continued. If there is a change, restart T-6 is initiated and the peak detection T-3 and the convergence T-4 are repeated to determined the optimum $V_H$ so that the refractive power of the variable refractive power element is changed to assure the highest quality of image. When there is no change in the sharpness for a predetermined time period, for example, one second, the restart F6 is forcibly initiated to newly set the $V_H$. The $V_H$ initially determined may not be the best one because of various errors, or a very rapid change of sharpness which cannot be detected may occur. Accordingly, this forcible restart prevents $V_H$ from being fixed to an incorrect value.

Figure 9B:
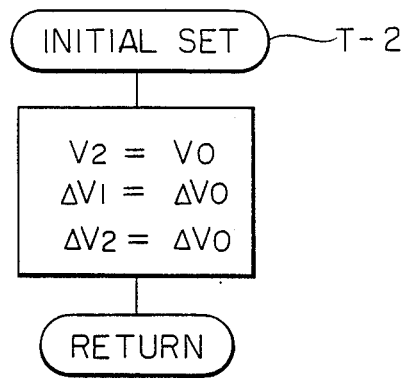

In an initialization T-2 shown in FIG. 9B, V2, $\Delta V1$ and $\Delta V2$ necessary in the next peak detection are set to V0 and $\Delta V0(\Delta V0>0)$.

Figure 9C:
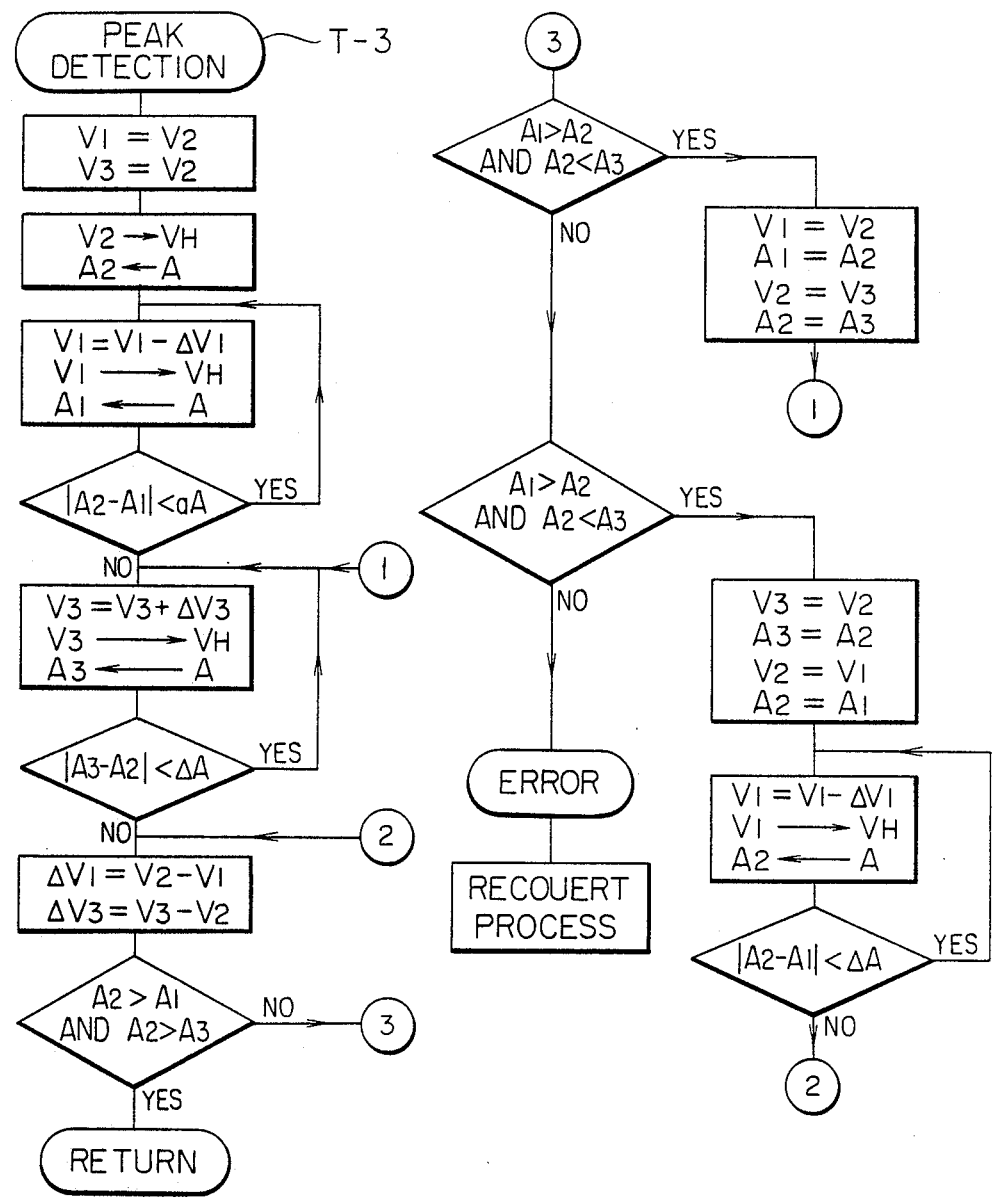

FIG. 9C shows an example of the peak detection T-3. The applied voltage $V_H$ is set to $V1=V1-\Delta V1$, V2 and $V3=V2+\Delta V2$, and the sharpnesses A1, A2 and A3 at those applied voltages are detected and compared. If a difference between A1, A2 and A3 is smaller than a minimum detectable sharpness increment $\Delta A$, V1 is changed to a smaller value and V3 is changed to a larger value, and the increments $\Delta V1$ and $\Delta V2$ for the change of $V_H$ are also changed. A1, A2 and A3 are compared, and if A2 is largest, the sharpness which brings the highest sharpness is between V1 and V3. Thus, the process returns. If A1>A2>A3, the highest sharpness is obtained at a lower $V_H$. Accordingly, the values of V1, V2 and V3 are reduced. If A1<A2<A3, the values of V1, V2 and V3 are increased. Then, the sharpnesses A1, A2 and A3 at the new V1, V2 and V3 are compared. This operation is repeated until V1, V2 and V3 which cause A1<A2 and A2>A3 are found.

If a contrast of the object is very low or distance confliction occurs, A1>A2 and A2<A3 may be met. In this case, the peak detection is not attained. Thus, an indication of focusing impossible may be displayed in a finder or the process may return to the start T-1 to retry the process, or the area on the CCD which detect the sharpness may be changed.

Figure 9D:
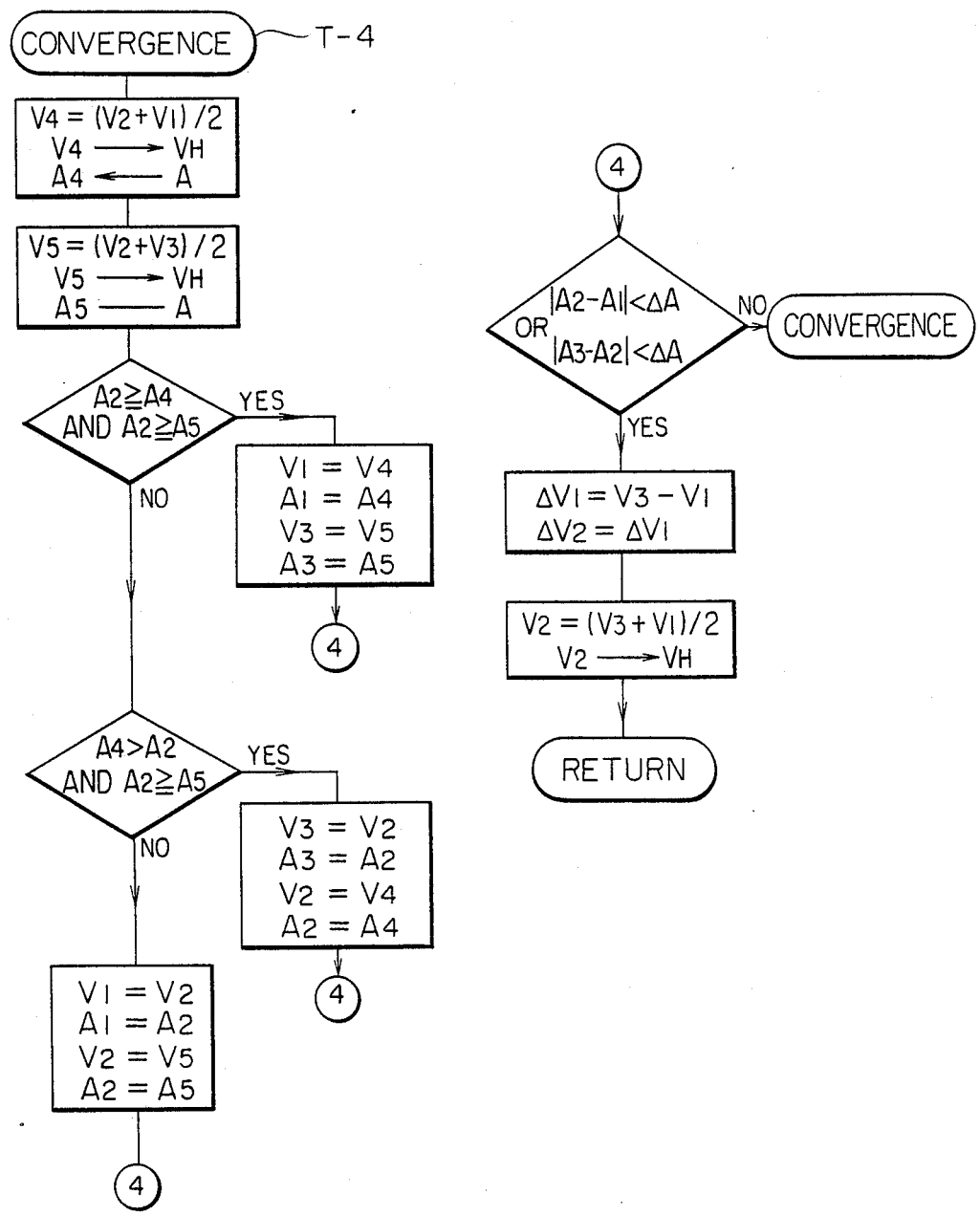

In convergence T-4 of FIG. 9D, since V1<V2<V3 which cause A1<A2 and A2>A3 are known, $V_H$ is changed between V1 and V3 to find an optimum $V_H$. A value V4 between V1 and V2 and a V5 between V2 and V3 are set, and the sharpnesses A4 and A5 when $V_H$ is equal to V4 and V5 are compared with the sharpness A2 when $V_H$ is equal to V2. If A2 is largest, the sharpness is highest when $V_H$ is between V4 and V5. Thus, V1 is set to V4 and V3 is set to V5 to reduce the range of $V_H$ and the process returns to the start. If A4 is largest, the sharpness is highest when $V_H$ is between V1 and V2, and if A5 is largest, the sharpness is highest when $V_H$ is between V2 and V3. Thus, V1, V2 and V3 are changed to narrow the range of $V_H$ and the process returns to the start.

By repeating the above steps, V1, V2 and V3 approach the optimum $V_H$ and the difference between the sharpness A1, A2 and A3 reaches the minimum detectable sharpness increment $\Delta A$. In this case, the convergence is completed and V2 is set to (V3+V1)/2 and it is applied as $V_H$. Then, the process returns.

Figure 9E:
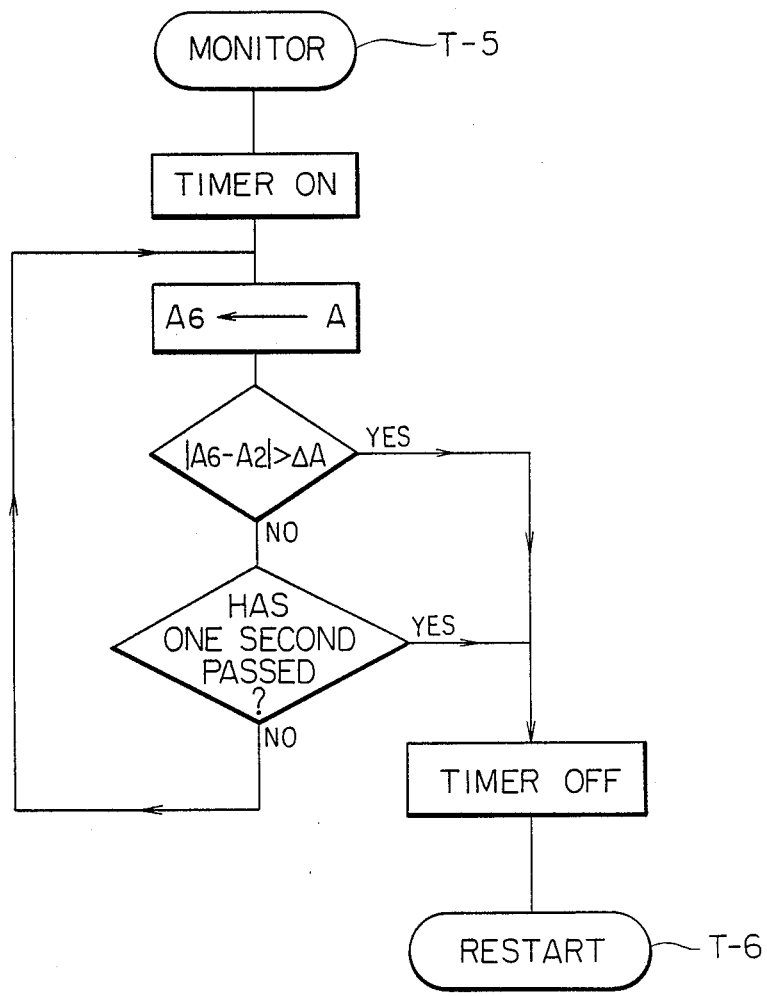

In a monitor T-5 of FIG. 9E, $V_H$ is equal to V2 and the refractive index of the variable refractive power element is controlled to produce the highest quality of image. In the monitor T-5, a time is counted and then sharpness A6 is detected for each frame and it is compared with the sharpness A2. If A6 has changed from A2, it is necessary to change $V_H$ to the optimum value Thus, the process returns to the restart T-6. One second after the start of the time measurement, the process returns to the restart T-6 to check if the current $V_H$ is the optimum value. In this manner, in the monitor T-5, when the sharpness changes or one second has been elapsed, the process returns to the restart T-6 to repeat the peak detection and the convergence. Since the initial values of V2, $\Delta V1$ and $\Delta V2$ in the restart are the most appropriate values in the previous step, the convergence is very rapid for the change of magnification and the change of distance to the object at the normal speed. Accordingly, once the refractive power of the variable refractive power element has been set to an appropriate value, the refractive power rapidly follows to the change of magnification and the change of distance to the object. When there is no change in the magnification or the distance to the object, the refractive power is changed only in several frames in one second. Therefore, defocusing does not occur.

As described hereinabove, the zoom lens of the present invention is simple and compact and allows the TTL auto-focus control which is practical and faster than the prior art system in which the lens unit is moved.

We claim:

1. An apparatus comprising:
   an object optical system imaging an object image and having at least one variable refractive power element;
   drive means for varying the refractive power of said variable refractive power element;
   an image receiving device for receiving an object image through said object optical system;
   first control means for controlling said drive means to move said object image along an optical axis by a predetermined distance;
   sharpness detection means for detecting a sharpness of an image projected on said image receiving device in accordance with an image signal derived from said image receiving device and for determining the direction of adjustment by comparing the image signals obtained before and after moving the object image by the predetermined distance; and
   second control means for controlling said drive means in accordance with the direction of adjustment.

2. An apparatus according to claim 1, wherein said object optical system further comprises a lens unit movable along an optical axis for changing focal distance.

3. An apparatus according to claim 1, wherein said variable refractive power element is a transparent and elastic body, and has an outer peripheral portion which is actuated in the direction of the optical axis.

* * * * *

UNITED STATES PATENT AND TRADEMARK OFFICE
CERTIFICATE OF CORRECTION

PATENT NO. : 4,820,028

DATED : April 11, 1989

INVENTOR(S) : Suda, et al.

It is certified that error appears in the above-identified patent and that said Letters Patent is hereby corrected as shown below:

COLUMN 1
    Line 14, "reguirement of" should read --requirement for--.

COLUMN 2
    Line 58, "compact" should read --a compact--.

COLUMN 6
    Line 6, "lowered." should read --lowered;--.

COLUMN 7
    Line 45, "value" should read --value.--.

Signed and Sealed this

Tenth Day of April, 1990

Attest:

HARRY F. MANBECK, JR.

*Attesting Officer*    *Commissioner of Patents and Trademarks*